July 5, 1927.
R. J. HIMMELRIGHT
METHOD OF MAKING ARCH BRICKS
Filed May 23, 1922
1,634,356
3 Sheets-Sheet 1
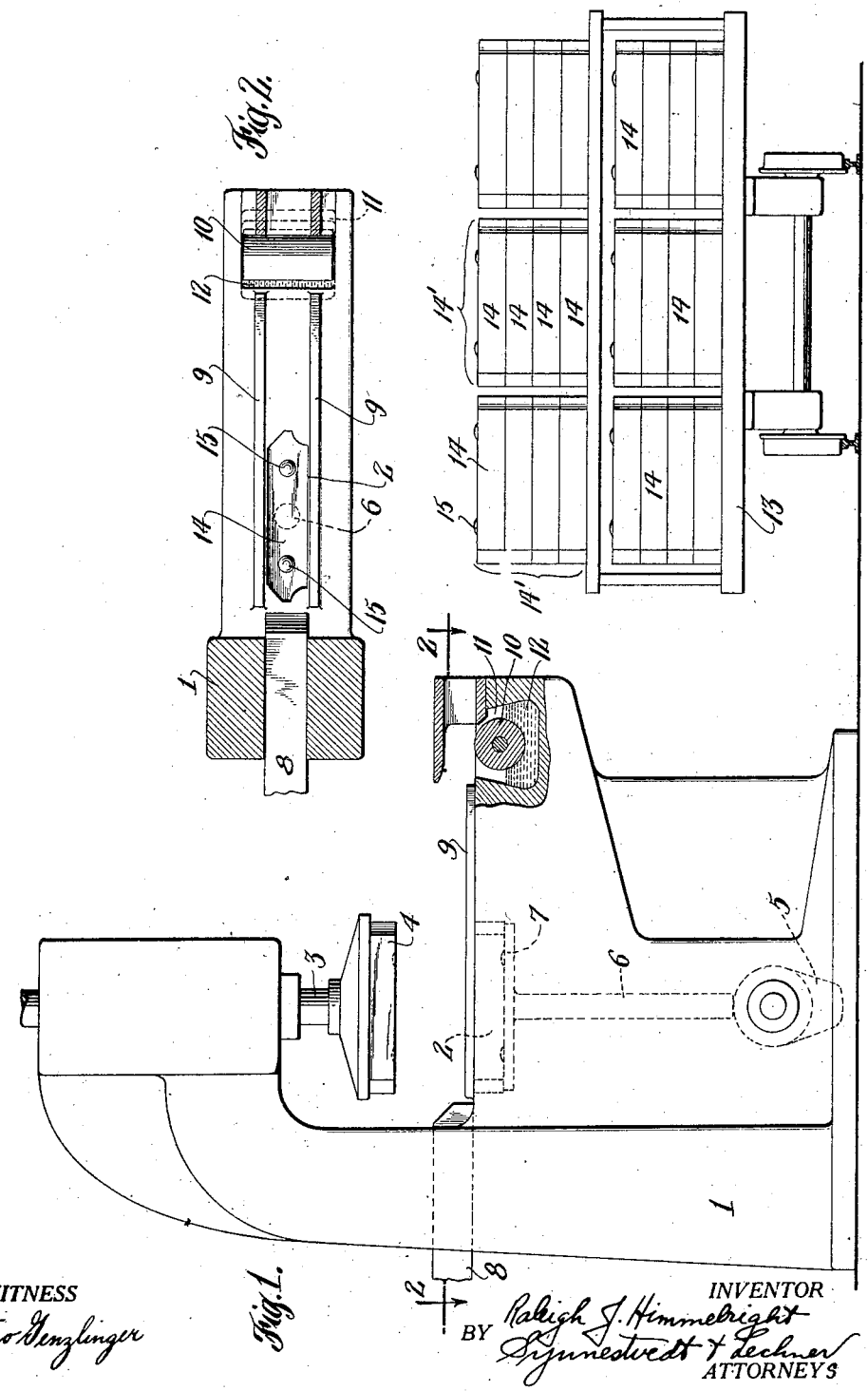
WITNESS
Gustav Genzlinger
INVENTOR
Raleigh J. Himmelright
BY Synnestvedt & Lechner
ATTORNEYS July 5, 1927.
R. J. HIMMELRIGHT
1,634,356
METHOD OF MAKING ARCH BRICKS
Filed May 23, 1922      3 Sheets-Sheet 2
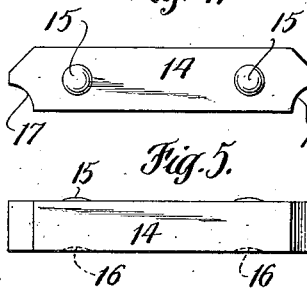
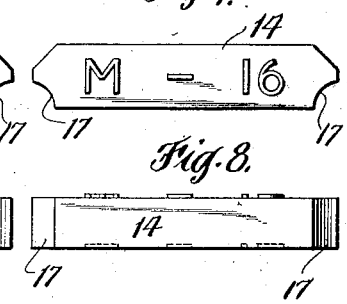
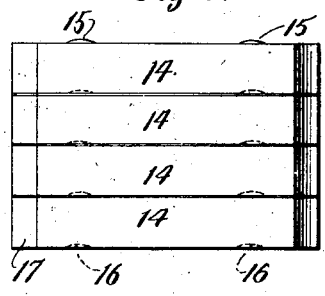
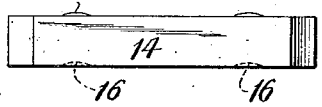
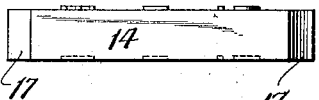
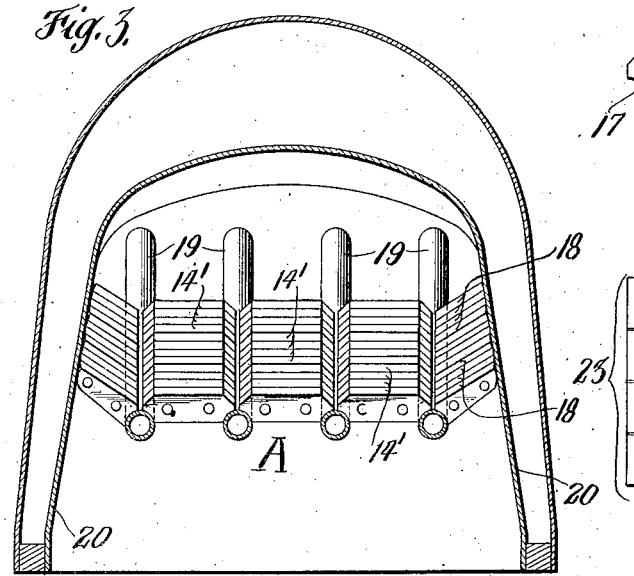
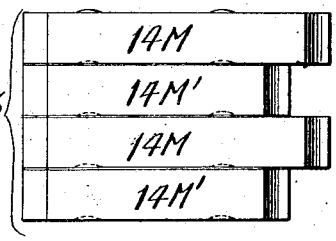
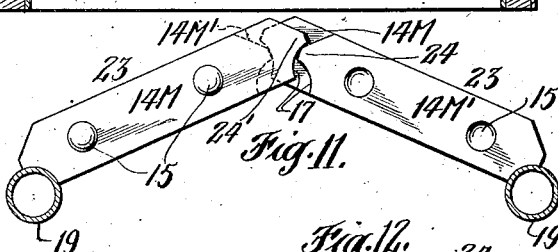
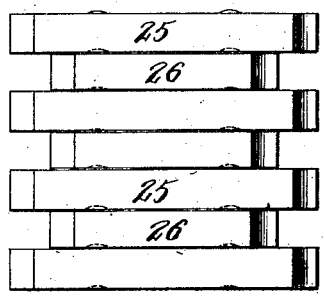
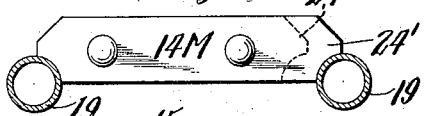
WITNESS
Gustav Genzlinger
INVENTOR
Raleigh J. Himmelright
BY
Synnestvedt & Lechner
ATTORNEYS July 5, 1927.
R. J. HIMMELRIGHT
1,634,356
METHOD OF MAKING ARCH BRICKS
Filed May 23, 1922 3 Sheets-Sheet 3
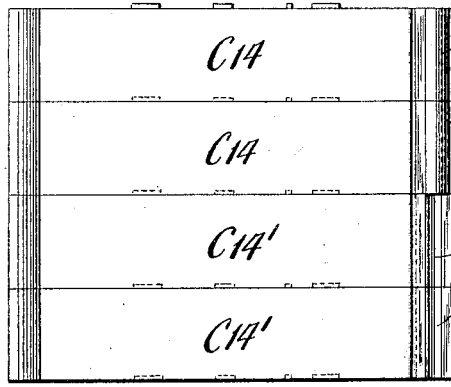
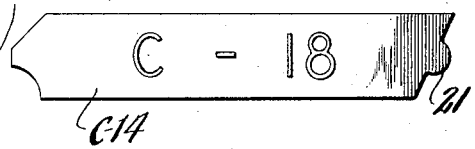
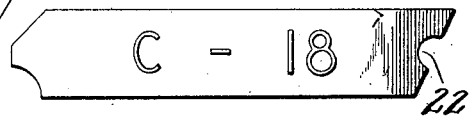
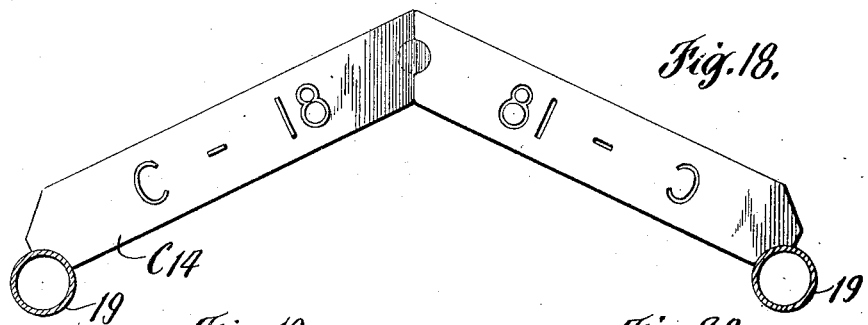
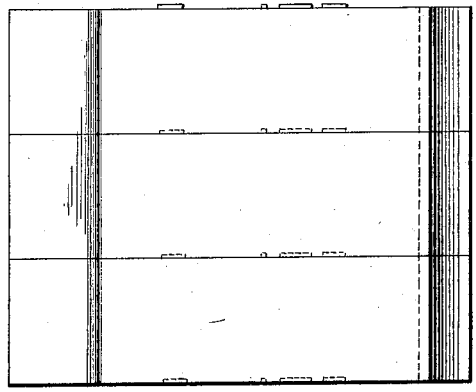
WITNESS
*Gustav Genzlinger.*
INVENTOR
*Raleigh J. Himmelright*
BY
ATTORNEYS Patented July 5, 1927.

1,634,356

UNITED STATES PATENT OFFICE.

RALEIGH J. HIMMELRIGHT, OF ENGLEWOOD, NEW JERSEY, ASSIGNOR TO AMERICAN ARCH COMPANY, A CORPORATION OF DELAWARE.

METHOD OF MAKING ARCH BRICKS.

Application filed May 23, 1922. Serial No. 563,043.

This invention relates to bricks for the construction of fire box arches, particularly locomotive fire box arches, and to an improved method of making the same.

One of the principal objects of the invention resides in the provision of a brick for the service specified which will be more durable than bricks heretofore in use and better able to withstand the severe conditions imposed upon it by virtue of expansion and contraction caused by the various and constantly varying temperatures. Another important object of the invention is the provision of a built up laminated brick. More specifically stated other objects of the invention may be said to reside in the provision of a laminated brick in which the individual units can be pressed upon a machine; the provision of a laminated brick in which the units are provided on the contacting surfaces with projections and recesses by means of which the units are held in position prior to bonding; the provision of bricks of laminated character which can be used either at the side or at the middle of the fire box; the provision of a laminated brick which can adapt itself to various tube spacings; the provision of a half tongue and groove laminated brick; the provision of a laminated brick the units of which can be bonded, dried and burned together; and the provision of a laminated brick which reduces spalling to a minimum.

These together with such other objects as may hereinafter appear or are incident to my invention, I attain by means of the method to be described hereinbelow in connection with the accompanying drawings wherein:

Fig. 1 is a diagrammatic side elevation, with a small portion in section illustrating the detail, showing a machine for pressing the units of my improved laminated brick and also a car or traveller for receiving the units in stacked relation; Fig. 2 is a section on the line 2—2 of Fig. 1; Fig. 3 is a partial vertical transverse section through a locomotive fire box illustrating an arch composed of my improved bricks; Figs. 4, 5 and 6 illustrate the units and a brick which represents what is known as the M pattern; Figs. 7 and 8 illustrate the same pattern but with the pattern marking used as a means for holding the units together prior to bonding; Figs. 9, 10, 11, 12 and 13 illustrate various uses to which a brick may be put which is composed of alternate long and short sections or units; Fig. 14 illustrates another manner in which long and short units may be assembled to form a brick; Figs. 15, 16, 17 and 18 illustrate a half tongue and groove laminated brick; Figs. 19 and 20 illustrate a laminated side brick; and Fig. 21 illustrates what is called a curved middle brick.

Heretofore it has been impossible to manufacture arch bricks as a commercial proposition by the use of a machine for pressing the clay in the mold. One of the chief reasons for this has been that the bricks were of such a size that they could not be conveniently handled as they came from the machine without danger of their losing shape while still in the plastic condition. To take as an example an ordinary M or middle brick such as those illustrated in Figs 4 to 8 inclusive it will be seen that since each unit is about 2½" wide and 16" long a whole brick (see Fig. 6) would be about 10" wide and 16" long. I do not introduce these sizes by way of limitation but only by way of illustration. A brick 10" wide and 16" long cannot be handled with impunity when in the soft or plastic state just after it has been removed from the mold. In order to make the use of a brick machine a paying proposition speed in handling is a prime essential but it was found in attempting to manufacture bricks of sizes approximating 10" x 16" that the necessary speed could not be obtained because of the deliberation and care necessary in handling the brick when it is removed from the machine.

It has also been found that a brick which has been molded in the dimensions given above, namely 10" x 16" will tend to spall or chip off after it has been placed in service due to the stresses which are set up under the contraction and expansion incident to variations in temperature. The resultant of the longitudinal and transverse enlargements and shrinkages in a brick 10" x 16" in size has proven of very serious consequence in the life of a brick. Cracking and chipping, known as spalling, quickly follow after a brick has been placed in service for a short while.

By my improvements I aim to obviate the above difficulties and to this end as already outlined I laminate the brick, that is build it up of a plurality of units of small size which can quickly and easily be made on a machine and readily bonded together to form a brick of the required or desired size.

In Fig. 1 of the drawings I have diagrammatically illustrated a hydraulic press 1 for pressing the bricks although any other type of press might be used. The clay is placed in the die 2 after which the machine is operated to bring down the plunger 3 which carries the member or plate 4 constructed to form the upper face of the brick. After the pressing operation rotation of the cam 5 acting through the stem 6 and the plate 7 will raise the molded brick unit into a position opposite the charger 8 and between the guides 9. This is clearly illustrated in Fig. 2. The charger 8 is then reciprocated to force the brick to the right between the guides 9 until it rides across the roller 10 which is located in a depression 11 partially filled with some sort of plastic bonding material 12 such as high temperature furnace cement commonly used in the art. The units are pressed on edge and as they come from the machine they are piled for example in groups of four upon a car or conveyor 13 to be removed to the drying and burning kiln. One side of each unit 14 is provided with one or more projections 15 and the opposite side is provided with corresponding recesses 16. (See Figs. 4 and 5.)

After the bonding material has been applied the units may be stacked as shown to any desired size, four units being illustrated as showing a very common standard size of arch brick.

The units are formed with their lower end corners cut away or recessed as at 17 in order to form in a finished brick tube engaging surfaces.

A brick of the type so far considered is shown as it would be applied in an arch A in Fig. 3. The middle bricks 14' are formed of units 14 such as in Fig. 6 and the side bricks 18 are also formed of separate units. The middle bricks span the distances between the supporting tubes 19 and the side bricks span the distances between the outer tubes and the side sheets 20. This is common and well known practice and need not be mentioned here except briefly.

The projections 15 fitting into the recesses 16 hold the units in place during handling prior to bonding. The bonding material is fixed, that is hardened in some way which might be either by drying or setting or by burning. It will be obvious that the units can be molded, stacked with the bonded material between units, dried and burned just as they come from the molding machine or they may be molded, dried and burned and afterwards bonded into bricks if so desired.

Instead of using the circular projections 15 and recesses 16 the M bricks might carry the pattern marking itself as illustrated in Figs. 7 and 8 for example where the M—16 can be arranged to hold the bricks in alignment during the bonding process. This is also used in connection with the so called C or center type brick which are assembled in pairs in reversed relation with their inner ends leaning against each other. This is illustrated in Figs. 15 to 18 inclusive, the C—18 representing the pattern number of this type of brick.

Figs. 15 to 18 inclusive also illustrate how this method of construction may be used to build up what is known as the half tongue and groove brick. Two units C—14 are molded with a projecting tongue 21 at the inner end and two units C—14' are molded with a corresponding recess 22 and then these four units are arranged as illustrated in Fig. 15 to form a completed brick which has at one end a tongue extending half way across the width of the brick and a groove extending across the other half of the width of the brick. The bricks may be assembled in pairs in reversed relation with their inner ends leaning against each other as illustrated in Fig. 18.

The side bricks 18 already mentioned in connection with Fig. 3 may be built up of units with the mark as illustrated in Fig. 20 and laminated curved middle bricks may be made as illustrated in Fig. 21.

In Figs. 9 and 10 I have illustrated a middle brick which is composed of alternated long and short units 14M and 14M'. At the left end these units are all placed flush so that there is one brick supporting surface at this end and a projecting supporting surface at the other end as well as a receding supporting surface. A brick of this character which I have indicated as a whole by the reference numeral 23 may be used in combination with another similar brick in the manner illustrated in Fig. 11. Here the two bricks are leaned together with the projecting portions of the unit 14M fitting into the receding portions of the unit 14M'.

It will of course be understood that each unit in the type of brick illustrated in Figs. 9 to 13 inclusive is provided at each end with the curved tube engaging socket or recess 17 and as the bricks are shown in Fig. 11 the nose 24 above the recess 17 of a shorter unit projects into the recess 17 below the nose 24' of a longer unit. This type of brick may also be used as illustrated in Fig. 12 where it spans the distance between two tubes with the tube engaging recess below the noses 24' of the longer units resting on the tubes. The bricks may also be used to take care of a shorter span by knocking off the noses 24' of the larger units and permitting the brick to rest upon the curved recesses 17 of the shorter units as illustrated in Fig. 13.

In Fig. 14 I have illustrated a type of brick in which there are a plurality of long units 25 and a plurality of short units 26 arranged in alternation with both ends of the longer units extending out beyond the ends of the shorter units.

Attention is directed to applicant's co-pending application Serial No. 578,544, filed July 31, 1922.

I claim:

The herein described method of making arch bricks which consists in molding a plurality of units and in drying and burning them together to form a brick.

In testimony whereof, I have hereunto signed my name.

RALEIGH J. HIMMELRIGHT.